(12) United States Patent
Johnson et al.

(10) Patent No.: US 10,821,884 B1
(45) Date of Patent: Nov. 3, 2020

(54) LIGHT GRILLE SURROUND AND EMBLEM ILLUMINATION

(71) Applicant: FORD GLOBAL TECHNOLOGIES, LLC, Dearborn, MI (US)

(72) Inventors: Aaron B. Johnson, Allen Park, MI (US); Luciano Lukacs, Plymouth, MI (US); Paul Kenneth Dellock, Northville, MI (US); Stuart C. Salter, White Lake, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/591,977

(22) Filed: Oct. 3, 2019

(51) Int. Cl.
*B60Q 1/26* (2006.01)
*B60Q 1/28* (2006.01)
*G09F 13/22* (2006.01)
*B60R 13/00* (2006.01)
*G09F 13/04* (2006.01)

(52) U.S. Cl.
CPC ............ *B60Q 1/2696* (2013.01); *B60Q 1/28* (2013.01); *B60R 13/005* (2013.01); *G09F 13/22* (2013.01); *G09F 2013/044* (2013.01); *G09F 2013/227* (2013.01)

(58) Field of Classification Search
CPC ...... B60Q 1/2661; B60Q 1/28; B60Q 1/2615; B60Q 1/2696; B60Q 2400/40; B60Q 3/14

USPC .................................................. 362/459–549
See application file for complete search history.

(56) References Cited

U.S. PATENT DOCUMENTS

| 8,642,977 | B2 | 2/2014 | Comerford et al. |
| 9,855,888 | B1* | 1/2018 | Dellock ............... F21S 43/33 |
| 2014/0240999 | A1* | 8/2014 | Roberts ............... B60Q 1/2615 362/510 |
| 2014/0328078 | A1* | 11/2014 | Williams ............. F21S 41/141 362/512 |
| 2016/0009216 | A1* | 1/2016 | Song .................... F21V 19/00 362/516 |
| 2018/0203176 | A1 | 7/2018 | Schmidt |
| 2019/0001901 | A1 | 1/2019 | Verwys et al. |
| 2019/0186709 | A1 | 6/2019 | Salter et al. |

* cited by examiner

*Primary Examiner* — William J Carter
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a fascia and an emblem mounted or molded to the fascia, where the emblem includes a plurality of quantum dots. The apparatus also includes an energy source to excite the quantum dots. A method according to an exemplary aspect of the present disclosure includes, among other things, providing an emblem with a plurality of quantum dots, mounting or molding the emblem to a fascia, and selectively exciting the quantum dots to illuminate the emblem.

20 Claims, 4 Drawing Sheets

LIGHT GRILLE SURROUND AND EMBLEM ILLUMINATION

TECHNICAL FIELD

This disclosure relates generally to a lighted grille surround for a vehicle that also includes an emblem that can be illuminated utilizing quantum dots.

BACKGROUND

Vehicle grilles can include lighting to selectively illuminate the grill. Grilles often include emblems, badges, or other identifying features that can be difficult to illuminate effectively.

SUMMARY

An apparatus according to an exemplary aspect of the present disclosure includes, among other things, a fascia and an emblem mounted or molded to the fascia, where the emblem includes a plurality of quantum dots. The apparatus also includes an energy source to excite the quantum dots.

In a further non-limiting embodiment of the foregoing apparatus, the energy source comprises a light source.

In a further non-limiting embodiment of any of the foregoing apparatus, the energy source comprises a source of electricity.

In a further non-limiting embodiment of any of the foregoing apparatus, a circuit board with at least one light is positioned on a rear side of the emblem, wherein the circuit board is connected to a controller that selectively generates a signal to activate the at least one light to excite the quantum dots in response to a predetermined operating condition.

In a further non-limiting embodiment of any of the foregoing apparatus, the emblem includes a layer of electrically chargeable film such that when not charged the film is opaque and when charged the film becomes clear to allow light to excite the quantum dots.

In a further non-limiting embodiment of any of the foregoing apparatus, the fascia includes a center body portion and a perimeter portion extending at least partially around the center body portion, and including a light source associated with the perimeter portion.

In a further non-limiting embodiment of any of the foregoing apparatus, the light source comprises a support that houses a plurality of lights.

In a further non-limiting embodiment of any of the foregoing apparatus, the plurality of lights include at least UV and/or white/RGB LEDs.

In a further non-limiting embodiment of any of the foregoing apparatus, the UV LEDs are used to excite the quantum dots and the white/RGB LEDs are used to illuminate the perimeter portion of the fascia with an option to cycle colors of perimeter lighting.

In a further non-limiting embodiment of any of the foregoing apparatus, the center body portion comprises a curved body with the emblem being positioned at an outermost surface of the curved body, and wherein one or more of the plurality of lights are angled within the support such that an entire surface of the curved body is illuminated around the emblem.

In a further non-limiting embodiment of any of the foregoing apparatus, a controller that selectively generates a signal is to activate one or more of the plurality of lights in response to a predetermined operating condition that includes one or more of a transmission gear mode, a turn signal mode, a daytime running light mode, a parking mode, or an autonomous vehicle mode.

An apparatus, according to yet another exemplary aspect of the present disclosure includes, among other things, a fascia including a center body portion and a perimeter portion extending at least partially around the center body portion, and a perimeter light source associated with the perimeter portion and that comprises a support that houses a plurality of lights that include at least UV and white/RGB LEDs. An emblem is mounted or molded to the center body portion of the fascia, and the emblem includes a plurality of quantum dots and a layer of electrically chargeable film such that when not charged the electrically chargeable film is dark and when charged the electrically chargeable film becomes clear. An energy source to excite the quantum dots and a controller selectively generates a signal to activate the energy source and/or to activate one or more of the plurality of lights in response to a predetermined operating condition.

In a further non-limiting embodiment of any of the foregoing apparatus, a plurality of circuit boards are mounted within the support and that include the UV and white/RGB LEDs, and wherein the plurality of circuit boards are connected to the controller.

In a further non-limiting embodiment of any of the foregoing apparatus, the energy source comprises electronics and/or UV light sources positioned on a rear side of the emblem that are controlled by the controller.

In a further non-limiting embodiment of any of the foregoing apparatus, the predetermined operating condition comprises a welcome or farewell function responsive such that during the welcome function the controller generates a signal to illuminate the perimeter light source and/or generates a signal to charge the electrically chargeable film allowing UV light to pass through to excite the quantum dots, and wherein during the farewell function, the controller generates a signal to deactivate the perimeter light source and/or generates a signal to stop charging the electrically chargeable film such that the electrically chargeable film darkens and colors of the quantum dots fade.

In a further non-limiting embodiment of any of the foregoing apparatus, the predetermined operating condition comprises a start-up function where the controller generates a signal to illuminate one or more of the plurality of lights of the perimeter light source, and/or generates a signal to illuminate the emblem with white/RGB LEDs or to charge the film and illuminate the emblem via the quantum dots to match a color of the vehicle.

In a further non-limiting embodiment of any of the foregoing apparatus, wherein the predetermined operating condition comprises a driving function where controller generates a signal to use the perimeter light source as a daytime running light and/or as a turn signal.

A method according to still another exemplary aspect of the present disclosure includes, among other things, providing an emblem with a plurality of quantum dots, mounting or molding the emblem to a fascia, and selectively exciting the quantum dots to illuminate the emblem.

In a further non-limiting embodiment of the foregoing method, the fascia includes a center body portion and a perimeter portion extending at least partially around the center body portion, and the method includes mounting a perimeter light source to the perimeter portion, the perimeter light source including a support that houses a plurality of lights that include at least UV and white/RGB LEDs.

In a further non-limiting embodiment of any of the foregoing methods, the method includes mounting the emblem to the center body portion of the fascia, providing the emblem with a layer of electrically chargeable film such that when not charged the electrically chargeable film is dark and when charged the electrically chargeable film becomes clear, and selectively charging the electrically chargeable film and activating an energy source to excite the quantum dots, and/or to activate one or more of the plurality of lights in response to a predetermined operating condition.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
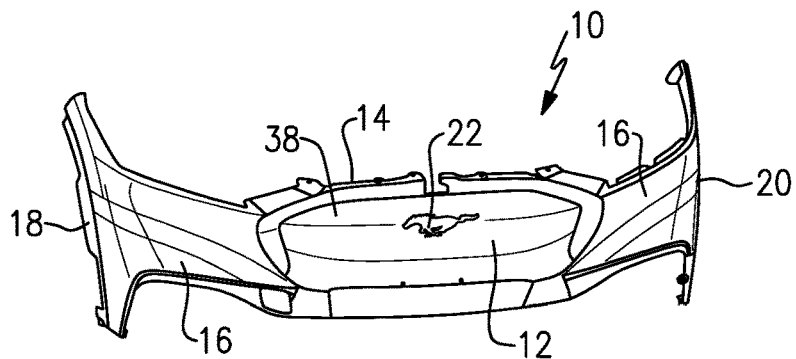
FIG. 1 illustrates a perspective view of a front fascia for a vehicle.

This disclosure details an exemplary lighted grille surround for a vehicle that also includes an emblem that can be illuminated utilizing quantum dots. FIG. 1 shows a fascia 10 for a vehicle (not shown). The fascia 10 includes a center body portion 12 and a perimeter portion 14 extending at least partially around the center body portion 12. The center body portion 12 comprises a grille and extension portions 16 extend outwardly from each side of the center body portion 12 toward headlight areas at opposing ends 18, 20 of a front of the vehicle.

Figure 2:
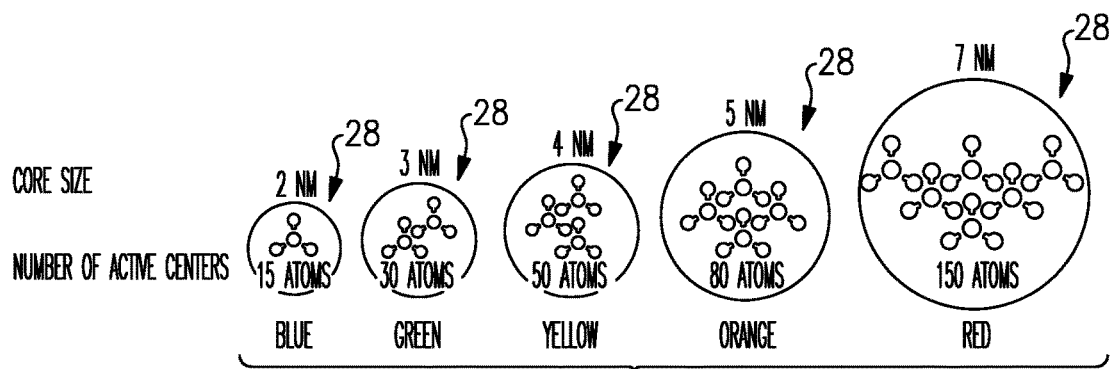
FIG. 2 illustrates an emblem or badge with quantum dots that is mounted or molded to the fascia.
Figure 2:
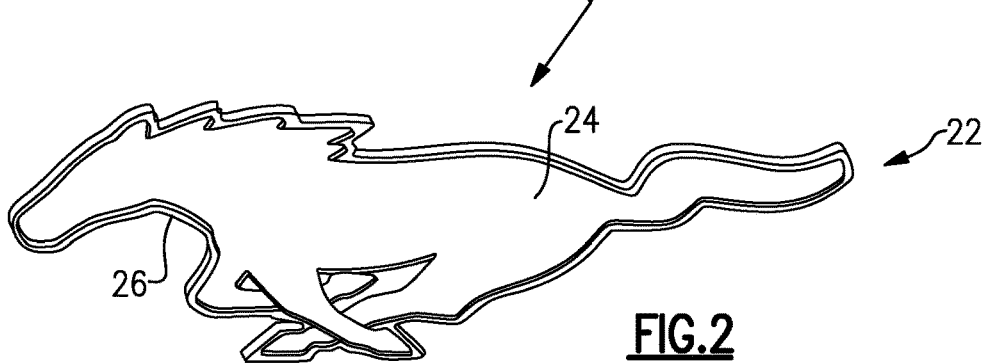

FIG. 2 shows a badge or an emblem 22 that is mounted or molded to the center body portion 12 of the fascia 10. In one example, the emblem 22 comprises a brand identifier or logo that is associated with the vehicle and/or vehicle manufacturer. The emblem 22 has an exterior surface 24 and an interior surface 26. The emblem 22 includes a plurality of quantum dots 28 that can be excited to glow or illuminate a specific color or colors.

Quantum dots (QDs) 28 are tiny semiconductor particles that are a few nanometers in size, and which have optical and electronic properties that differ from larger particles due to quantum mechanics. The size, emission color, and energy levels of the QDs 28 can be precisely controlled to provide the desired lighting effect. The emission color of the QDs 28 depends on the size of the dot 28 and not the material of the dot itself. The bigger the QD 28, the larger the wavelength and the smaller the frequency, and the smaller the QD 28, the shorter the wavelength and the greater the frequency.

As known, the color of light is dependent on its wavelength. As shown in FIG. 2, the larger QDs 28, e.g. 7 nm for example, will emit red light, while the smaller QDs 28, e.g. 2 nm for example, will emit blue light. Other colors, such as green (3 nm), yellow (4 nm), orange (5 nm), etc., are emitted within a range of sizes between blue and red. The color change phenomena is the result of different band gaps between different size QDs 28. The band gap for a semiconductor is the energy required for its electrons to enter an excited state. Smaller dots 28 have large band gaps so they require a lot of energy to enter an excited state. The high energy input results in a high-energy frequency, which in turn results in a smaller wavelength of light. This is why small dots 28 emit light toward the blue end of the spectrum and larger dots 28 emit light toward the red end of the spectrum. QDs 28 emit light through photoluminescence or electroluminescence. As such, the QDs 28 will glow when illuminated by ultraviolet (UV) light or electricity.

The QDs 28 are applied to the emblem 22 such that when the dots 28 are excited they will cause the emblem 22 to glow. The dots 28 can be located on the exterior surface 24 of the emblem 22, or can be embedded within or located on the interior surface 26 of the emblem 22. When embedded within or located on the interior surface 26 of the emblem 22, the QDs 28 will glow through the exterior surface 24. This will be discussed in greater detail below.

Figure 3:
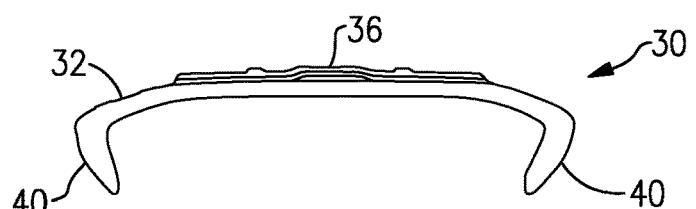
FIG. 3 is a perspective view of a perimeter light source that surrounds at least a portion of the fascia.
Figure 4:
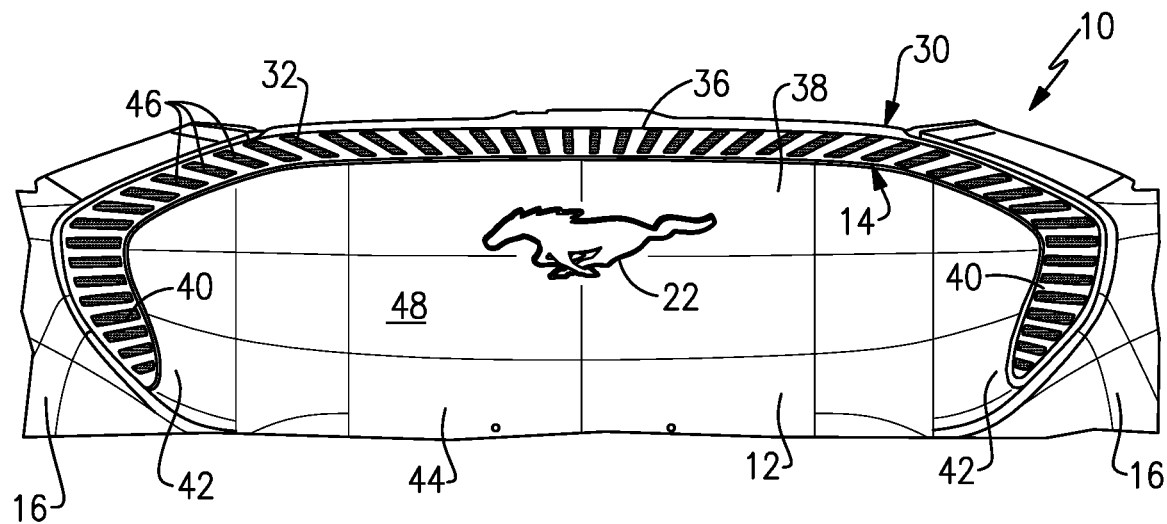
FIG. 4 is a front view of the fascia, emblem, and perimeter light source as assembled and in an unilluminated state.
Figure 5:
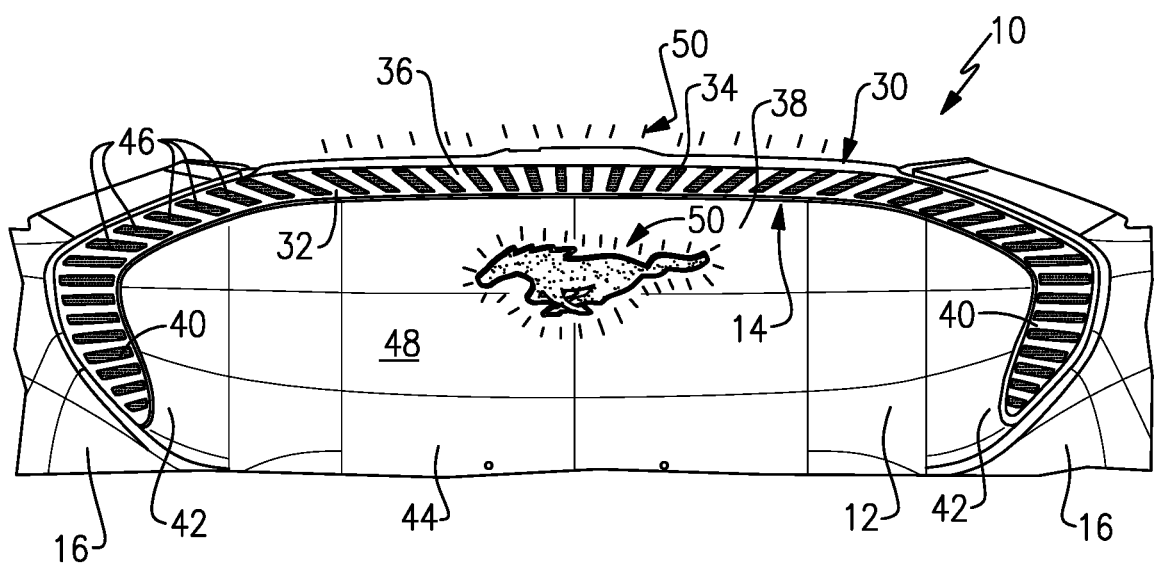
FIG. 5 is a view similar to FIG. 4 but in an illuminated state.

FIGS. 3-5 show a perimeter light source 30 that is associated with the perimeter portion 14 of the fascia 10. The perimeter light source 30 includes a supporting body 32 that houses a plurality of lights 34 (FIGS. 5 and 6) that include at least UV lights and/or white light/RGB light emitting diodes (LEDs). In one example, the supporting body 32 includes a center portion 36 that extends around an upper portion 38 of the center body portion 12 of the fascia 10, and a pair of curved portions 40 that extend downward around opposing edges 42 of the center body portion 12. Thus, the perimeter light source 30 extends substantially around the center body portion 12 and associated emblem 22, leaving only a lower portion 44 of the center body portion 12 free from the perimeter light source 30. In an alternate configuration, the perimeter light source 30 may surround the center body portion 12 in its entirety.

As shown in FIGS. 4-5, the supporting body 32 includes a series of gaps, slots, openings 46 through which the plurality of lights 34 can emit light to illuminate the perimeter portion 14 as well as the emblem 22 and/or a front surface 48 of the center body portion 12 of the fascia 10 that surrounds the emblem 22. FIG. 4 shows the perimeter light source 30 and the emblem 22 in a non-illuminated state. FIG. 5 shows the perimeter light source 30 and the emblem 22 in an illuminated state as indicated at 50.

An energy source that excites the quantum dots 28 can comprise a light source or a source of electricity. A controller is configured to selectively generate a signal to activate the energy source and/or to activate one or more of the plurality of lights in response to a predetermined operating condition.

Figure 6:
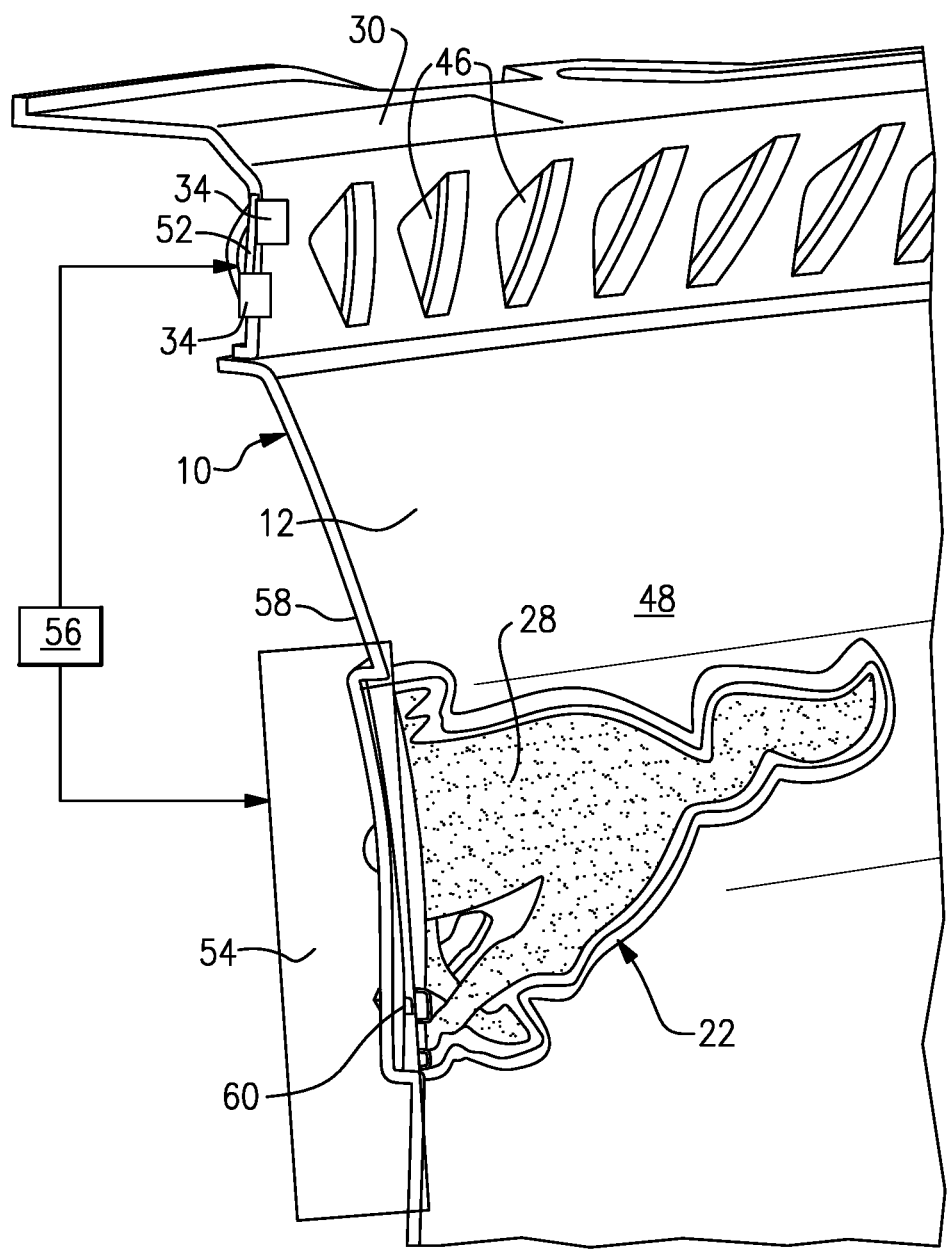
FIG. 6 is a section view of the fascia, emblem, and perimeter light source.

FIG. 6 shows one example where the perimeter light source 30 includes a plurality of LED circuit boards 52 that support the plurality of lights 34. The boards 52 are positioned behind the supporting body 32 such that the lights can glow or emit light through the openings 46. In one example, the energy source that excites the dots 28 comprises electronics and/or UV light sources 54 that are positioned on the interior side 26 of the emblem 22. For example, the electronics can comprise an electrical connector and driver that are mounted, along with any light sources, via a bracket behind the emblem 22. The LED circuit boards 52 and the electronics and/or UV light sources 54 are controlled by a controller 56. The controller 56 comprises a processor, a central processing unit (CPU), an auxiliary processor among several processors associated with a computing device, a semiconductor based microprocessor (in the form of a microchip or chip set), or generally any device for executing software instructions. The controller 56 can be a dedicated controller or can be a controller that is also used for another vehicle system.

As shown in FIG. 6, the center body portion 12 comprises a curved body, as indicated at 58, with the emblem 22 being positioned at an outermost surface of the curved body 58. This can make it difficult to illuminate the entirety of the front surface 48 of the center body portion 12, especially in the area below the emblem 22. In one example, one or more of the plurality of lights 34 are angled within the supporting body 32 such that the entire surface area of the curved body in the center portion 12 is illuminated around the emblem 22.

Figure 7:
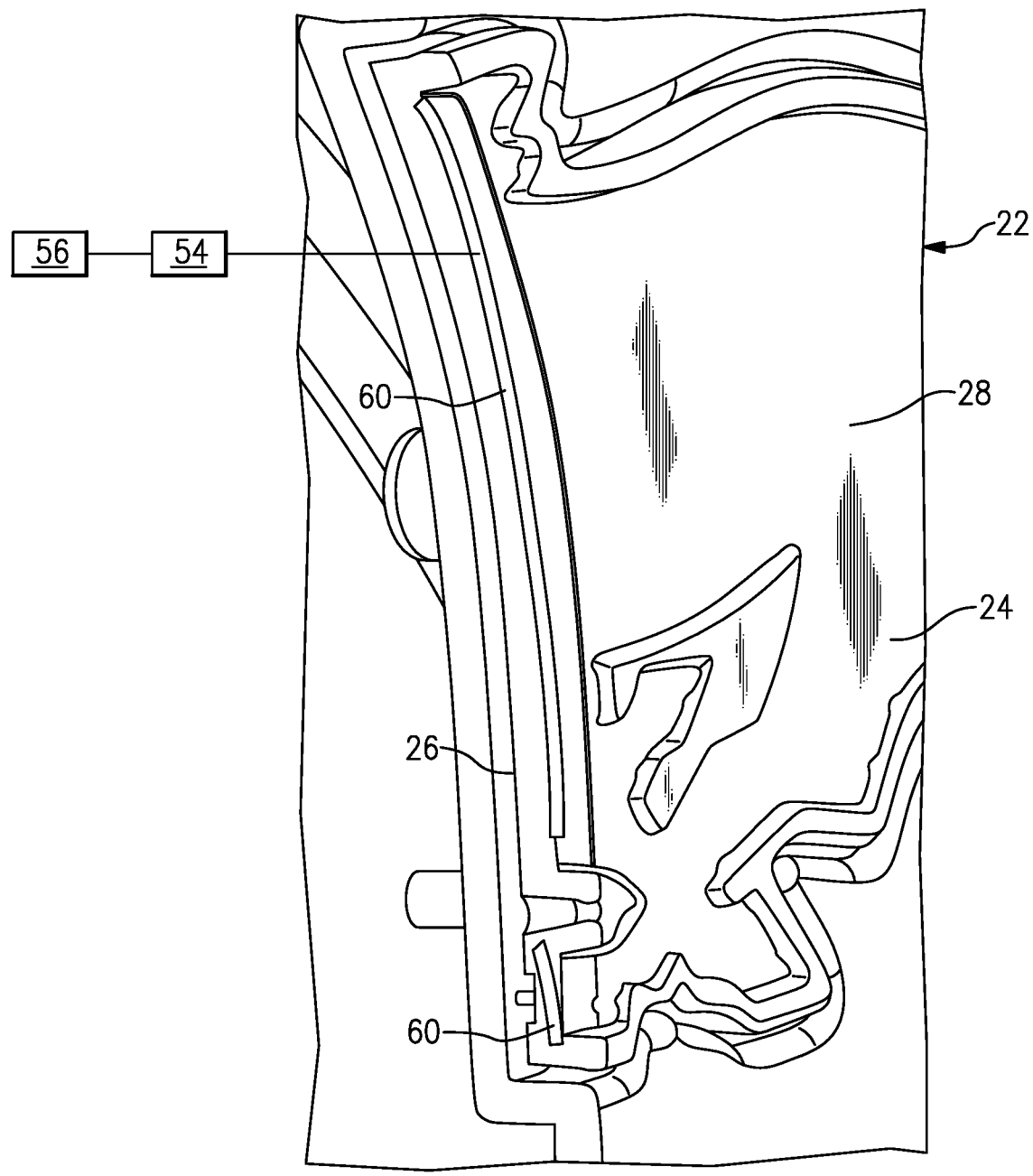
FIG. 7 a section view of the emblem showing an electrically chargeable film.

In one example, the emblem 22 can include a layer of electrically chargeable film 60. This is shown in greater detail in FIG. 7. In this example, the exterior surface 24 of the emblem comprises the QDs 28. The layer of film 60 is completely embedded within the emblem 22 such that the QDs are outward of the film 60 and the electronics and/or UV light sources 54 are behind the film 60. When the layer of electrically chargeable film 60 is not charged, the electrically chargeable film 60 is opaque or dark and the emblem does not glow or illuminate. When the layer of electrically chargeable film 60 is charged, the electrically chargeable film 60 becomes clear, allowing UV light from the rear of the emblem 22 to excite the QDs 28 on the emblem for a glow effect.

The subject disclosure provides a multi-use lit grille perimeter in combination with an illuminated emblem. The controller 56 selectively generates a signal to activate the energy source and/or to activate one or more of the plurality of lights, and/or to illuminate the emblem, in response to one or more predetermined operating conditions. These operating conditions can include park/position (transmission gear mode), welcome/farewell, daytime running lights, autonomous vehicle, and turn signal functions, for example. Examples of these are discussed below.

In one example, for the welcome function of a user approaching the vehicle, the perimeter light source 30 illuminates, the film 60 is charged allowing UV light to pass thru to excite the QDs 28 to allow a color of the emblem 22 to match a color of the vehicle. The intensity of the lighted perimeter can increase or decrease as a further enhancement. For the farewell function, the film charge is dropped allowing the film 60 to darken/blacken as the QDs color fades to black.

In one example, for a start-up function, the LED lights 34 of the perimeter light source 30 can illuminate one by one to simulate a dot of light racing around the center body portion 12 of the fascia 10 and the emblem 22 illuminates a white light. Upon the transmission leaving a park position after start-up, the white emblem 22 can become the quantum dot glow color that corresponds to the vehicle color. Once the vehicle is driving, the surrounding perimeter light source 30 can behave as a daytime running (DRL) lamp with an entire perimeter illumined and a series of UV LEDs lights 34 continuing to illumine the emblem 22 from the front center. In one example of a turn signal function, upon a right turn, the DRL shuts off and the right hand side of the perimeter blinks amber in alternation with the turn function of a main lamp. Similarly, upon a left turn, the DRL shuts off and the left hand side of the perimeter blinks amber in alternation with the turn function of the main lamp. In one example, in an autonomous vehicle mode, the perimeter can turn a specified color, e.g. an aqua color, and low/high beams of the main lamps can function at 50% for the DRL function.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a fascia;
   an emblem mounted or molded to the fascia and having an exterior surface, the emblem including a plurality of quantum dots that are on the exterior surface of the emblem or are embedded within the emblem;
   a layer of electrically chargeable film embedded within the emblem;
   an energy source to excite the plurality of quantum dots, wherein the plurality of quantum dots are outward of the layer of electrically chargeable film and the energy source is behind the layer of electrically chargeable film; and
   when the layer of electrically chargeable film is not charged the layer of electrically chargeable film is opaque and when the layer of electrically chargeable film is charged the layer of electrically chargeable film becomes clear to allow the energy source to excite the plurality of quantum dots.

2. The apparatus according to claim 1, wherein the energy source comprises a light source.

3. The apparatus according to claim 1, wherein the energy source comprises a source of electricity.

4. The apparatus according to claim 1, including a circuit board with at least one light positioned on a rear side of the emblem, wherein the circuit board is connected to a controller that selectively generates a signal to activate the at least one light to excite the quantum dots in response to a predetermined operating condition.

5. The apparatus according to claim 1, wherein the fascia includes a center body portion and a perimeter portion extending at least partially around the center body portion, and including a light source associated with the perimeter portion.

6. The apparatus according to claim 5, wherein the light source comprises a support that houses a plurality of lights.

7. The apparatus according to claim 6, wherein the plurality of lights include at least UV and/or white/RGB LEDs.

8. The apparatus according to claim 6, wherein the center body portion comprises a curved body with the emblem being positioned at an outermost surface of the curved body, and wherein one or more of the plurality of lights are angled within the support such that an entire surface of the curved body is illuminated around the emblem.

9. The apparatus according to claim 6, including a controller that selectively generates a signal to activate one or more of the plurality of lights in response to a predetermined operating condition that includes one or more of a transmission gear mode, a turn signal mode, a daytime running light mode, a parking mode, or an autonomous vehicle mode.

10. An apparatus, comprising:
a fascia including a center body portion and a perimeter portion extending at least partially around the center body portion;
a light source associated with the perimeter portion, wherein the light source comprises a support that houses a plurality of lights, and wherein the plurality of lights include at least UV and/or white/RGB LEDs;
an emblem mounted or molded to the fascia, the emblem including a plurality of quantum dots; and
an energy source to excite the quantum dots, wherein the UV LEDs are used to excite the quantum dots and the white/RGB LEDs are used to illuminate the perimeter portion of the fascia with an option to cycle colors of perimeter lighting.

11. An apparatus, comprising:
a fascia including a center body portion and a perimeter portion extending at least partially around the center body portion;
a perimeter light source associated with the perimeter portion and that comprises a support that houses a plurality of lights that include at least UV and white/RGB LEDs;
an emblem mounted or molded to the center body portion of the fascia, the emblem having an exterior surface and including a plurality of quantum dots that are on the exterior surface of the emblem or are embedded within the emblem, and wherein the emblem includes a layer of electrically chargeable film embedded within the emblem such that when not charged the layer of electrically chargeable film is dark and when charged the layer of electrically chargeable film becomes clear;
an energy source to excite the plurality of quantum dots, wherein the plurality of quantum dots are outward of the layer of electrically chargeable film and the energy source is behind the layer of electrically chargeable film; and
a controller that selectively generates a signal to activate the energy source and/or to activate one or more of the plurality of lights in response to a predetermined operating condition.

12. The apparatus according to claim 11, including a plurality of circuit boards mounted within the support and that include the UV and white/RGB LEDs, and wherein the plurality of circuit boards are connected to the controller.

13. The apparatus according to claim 12, wherein the energy source comprises electronics and/or UV light sources positioned on a rear side of the emblem that are controlled by the controller.

14. The apparatus according to claim 13, wherein the predetermined operating condition comprises a welcome or farewell function responsive such that during the welcome function the controller generates a signal to illuminate the perimeter light source and/or generates a signal to charge the electrically chargeable film allowing UV light to pass through to excite the quantum dots, and wherein during the farewell function, the controller generates a signal to deactivate the perimeter light source and/or generates a signal to stop charging the electrically chargeable film such that the electrically chargeable film darkens and colors of the quantum dots fade.

15. The apparatus according to claim 13, wherein the predetermined operating condition comprises a start-up function where the controller generates a signal to illuminate one or more of the plurality of lights of the perimeter light source, and/or generates a signal to illuminate the emblem with white/RGB LEDs or to charge the film and illuminate the emblem via the quantum dots to match a color of the vehicle.

16. The apparatus according to claim 13, wherein the predetermined operating condition comprises a driving function where controller generates a signal to use the perimeter light source as a daytime running light and/or as a turn signal.

17. The apparatus according to claim 11, wherein the UV LEDs are used to excite the plurality of quantum dots and the white/RGB LEDs are used to illuminate the perimeter portion of the fascia with an option to cycle colors of perimeter lighting.

18. A method comprising:
providing an emblem with a plurality of quantum dots that are on an exterior surface of the emblem or are embedded within the emblem;
embedding a layer of electrically chargeable film within the emblem;
mounting or molding the emblem to a fascia;
selectively exciting the plurality of quantum dots via an energy source to illuminate the emblem, wherein the plurality of quantum dots are outward of the layer of electrically chargeable film and the energy source is behind the layer of electrically chargeable film; and
selectively charging the layer of electrically chargeable film such that the layer of electrically chargeable film changes from opaque to clear to allow the energy source to excite the plurality of quantum dots in response to a predetermined operating condition.

19. The method according to claim 18, wherein the fascia includes a center body portion and a perimeter portion extending at least partially around the center body portion, and including mounting a perimeter light source to the perimeter portion, the perimeter light source including a support that houses a plurality of lights that include at least UV and white/RGB LEDs, and wherein the UV LEDs are used to excite the plurality of quantum dots and the white/RGB LEDs are used to illuminate the perimeter portion of the fascia with an option to cycle colors of perimeter lighting.

20. The method according to claim 18, including mounting the emblem to the center body portion of the fascia, and selectively charging the electrically chargeable film and activating the energy source to excite the plurality of quantum dots, and/or to activate one or more of the plurality of lights in response to the predetermined operating condition.

* * * * *